United States Patent
Kamerbeek et al.

(10) Patent No.: US 9,604,776 B2
(45) Date of Patent: Mar. 28, 2017

(54) SYSTEM, METHOD AND CAPSULE FOR PREPARING A BEVERAGE

(75) Inventors: Ralf Kamerbeek, De Meern (NL); John Henri Flamand, Lunteren (NL); Angenita Dorothea van Loon-Post, Utrecht (NL); Hendrik Cornelis Koeling, Amersfoort (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 13/314,856

(22) Filed: Dec. 8, 2011

(65) Prior Publication Data

US 2012/0121765 A1 May 17, 2012

Related U.S. Application Data

(63) Continuation of application No. PCT/NL2009/050834, filed on Dec. 30, 2009.

(30) Foreign Application Priority Data

Jun. 17, 2009 (EP) .................................... 09162917
Jun. 17, 2009 (EP) .................................... 09162927

(Continued)

(51) Int. Cl.
*B65D 85/804* (2006.01)
*A47J 31/36* (2006.01)
(Continued)

(52) U.S. Cl.
CPC .......... *B65D 85/8043* (2013.01); *A23F 5/262* (2013.01); *A47J 31/0673* (2013.01);
(Continued)

(58) Field of Classification Search
CPC B65D 85/804; B65D 85/8043; B65D 65/466; A47J 31/368; A47J 31/005;
(Continued)

(56) References Cited

U.S. PATENT DOCUMENTS 2,451,195 A 10/1948 Brown
3,615,708 A 10/1971 Abile-Gal
(Continued)

FOREIGN PATENT DOCUMENTS

CA 2181246 9/1995
CN 1126462 7/1996
(Continued)

OTHER PUBLICATIONS

Ephraim, D., Coffee Grinding, Tea and Coffee Trade Journal, Nov. 2003, p. 1-4, [on line], retrieved May 12, 2013. Retrieved from the Internet: URL:<http://www.mpechicago.com/coffee/images/uploads/pdfs/COFFEE_GRINDING_Nov03.pdf>.*
(Continued)

*Primary Examiner* — Chaim Smith
(74) *Attorney, Agent, or Firm* — Foley & Lardner LLP

(57) ABSTRACT

A system, method and capsule for preparing a predetermined quantity of beverage suitable for consumption using an extractable product is disclosed. The system comprises an exchangeable capsule, and an apparatus comprising a receptacle for holding the exchangeable capsule, and a fluid dispensing device for supplying a fluid to the exchangeable capsule. The exchangeable capsule comprises a circumferential wall, a bottom, and a lid. The wall, bottom and lid enclose an inner space comprising the extractable product. The bottom comprises an entrance area for supplying an amount of a fluid by the fluid dispensing device through the entrance area to the capsule. The lid comprises an exit area for supplying a prepared beverage through the exit area from
(Continued)

the capsule to a container. The flow resistance of the entrance area of the capsule is lower than the flow resistance of the exit area.

26 Claims, 5 Drawing Sheets

(30) Foreign Application Priority Data

| Jun. 17, 2009 | (EP) | 09162941 |
|---|---|---|
| Jun. 17, 2009 | (EP) | 09162984 |

(51) Int. Cl.

| A23F 5/26 | (2006.01) |
|---|---|
| A47J 31/40 | (2006.01) |
| B65D 65/46 | (2006.01) |
| A47J 31/00 | (2006.01) |
| A47J 31/06 | (2006.01) |

(52) U.S. Cl.
CPC ............ *A47J 31/368* (2013.01); *A47J 31/407* (2013.01); *B65D 65/466* (2013.01); *A47J 31/005* (2013.01); *A47J 31/0663* (2013.01)

(58) Field of Classification Search
CPC .. A47J 31/0663; A47J 31/0673; A47J 31/407; A23F 5/262
USPC .......................... 426/77–84; 99/295
See application file for complete search history.

(56) References Cited

U.S. PATENT DOCUMENTS

| 4,229,481 | A | * | 10/1980 | Fornari | 426/77 |
|---|---|---|---|---|---|
| 4,254,694 | A | * | 3/1981 | Illy | 99/295 |
| 4,321,139 | A | | 3/1982 | Auclair | |
| 4,389,925 | A | * | 6/1983 | Piana | 99/289 R |
| 4,417,504 | A | | 11/1983 | Yamamoto | |
| 4,550,024 | A | | 10/1985 | Le Granse | |
| 4,859,337 | A | | 8/1989 | Woltermann | |
| 5,197,374 | A | | 3/1993 | Fond | |
| 5,243,164 | A | | 9/1993 | Erickson et al. | |
| 5,325,765 | A | | 7/1994 | Sylvan et al. | |
| 5,840,189 | A | | 11/1998 | Sylvan et al. | |
| D408,679 | S | | 4/1999 | Potts et al. | |
| 5,897,899 | A | | 4/1999 | Fond | |
| 6,079,315 | A | | 6/2000 | Beaulieu et al. | |
| 6,082,247 | A | | 7/2000 | Beaulicu | |
| 6,142,063 | A | | 11/2000 | Beaulieu et al. | |
| 6,182,554 | B1 | | 2/2001 | Beaulieu et al. | |
| D452,433 | S | | 12/2001 | Lazaris | |
| D452,434 | S | | 12/2001 | Sweeney | |
| 6,440,256 | B1 | | 8/2002 | Gordon et al. | |
| D462,865 | S | | 9/2002 | Honan et al. | |
| D474,110 | S | | 5/2003 | Sweeney | |
| D474,111 | S | | 5/2003 | Lazaris | |
| 6,589,577 | B2 | | 7/2003 | Lazaris et al. | |
| 6,606,938 | B2 | | 8/2003 | Taylor | |
| 6,607,762 | B2 | | 8/2003 | Lazaris et al. | |
| 6,644,173 | B2 | | 11/2003 | Lazaris et al. | |
| 6,645,537 | B2 | | 11/2003 | Sweeney et al. | |
| 6,655,260 | B2 | | 12/2003 | Lazaris et al. | |
| 6,658,989 | B2 | | 12/2003 | Sweeney et al. | |
| 6,666,130 | B2 | | 12/2003 | Taylor et al. | |
| 6,672,200 | B2 | | 1/2004 | Duffy et al. | |
| 6,708,600 | B2 | | 3/2004 | Winkler et al. | |
| D489,215 | S | | 5/2004 | Honan et al. | |
| D502,362 | S | | 3/2005 | Lazaris et al. | |
| D513,572 | S | | 1/2006 | Schaffeld et al. | |
| 7,165,488 | B2 | | 1/2007 | Bragg et al. | |
| D544,299 | S | | 6/2007 | Schaffeld et al. | |
| D554,299 | S | | 10/2007 | Ragonetti et al. | |
| 7,347,138 | B2 | | 3/2008 | Bragg et al. | |
| 7,360,418 | B2 | | 4/2008 | Pelovitz | |
| 7,377,162 | B2 | | 5/2008 | Lazaris | |
| 7,398,726 | B2 | | 7/2008 | Streeter et al. | |
| 7,513,192 | B2 | | 4/2009 | Sullivan et al. | |
| 7,523,695 | B2 | | 4/2009 | Streeter et al. | |
| 7,543,527 | B2 | | 6/2009 | Schmed | |
| 7,552,672 | B2 | | 6/2009 | Schmed | |
| 7,640,845 | B2 | | 1/2010 | Woodnorth et al. | |
| 7,856,920 | B2 | | 12/2010 | Schmed et al. | |
| 2004/0045443 | A1 | | 3/2004 | Lazaris et al. | |
| 2005/0016383 | A1 | | 1/2005 | Kirschner et al. | |
| 2005/0051478 | A1 | | 3/2005 | Karanikos et al. | |
| 2005/0158426 | A1 | | 7/2005 | Hu et al. | |
| 2005/0205601 | A1 | | 9/2005 | Taylor | |
| 2005/0287251 | A1 | | 12/2005 | Lazaris et al. | |
| 2006/0174773 | A1 | | 8/2006 | Taylor | |
| 2006/0292012 | A1 | | 12/2006 | Brudevold et al. | |
| 2008/0095904 | A1 | | 4/2008 | Sullivan et al. | |
| 2008/0115674 | A1 | | 5/2008 | Huang et al. | |
| 2008/0134902 | A1 | | 6/2008 | Zimmerman et al. | |
| 2010/0024658 | A1 | | 2/2010 | Jacobs et al. | |
| 2010/0303964 | A1 | | 12/2010 | Beaulieu et al. | |

FOREIGN PATENT DOCUMENTS

| CN | 101263066 | 9/2008 |
|---|---|---|
| CN | 101316772 | 12/2008 |
| EP | 0 211 511 A1 | 2/1987 |
| EP | 0 512 142 A1 | 11/1992 |
| EP | 0 512 468 A1 | 11/1992 |
| EP | 0 749 283 B1 | 12/1996 |
| EP | 1 042 978 B1 | 10/2000 |
| EP | 1 243 210 B1 | 9/2002 |
| EP | 1 513 741 B1 | 3/2005 |
| EP | 1 555 219 | 7/2005 |
| EP | 1 555 219 A1 | 7/2005 |
| EP | 1 566 127 A2 | 8/2005 |
| EP | 1 580 144 A1 | 9/2005 |
| EP | 1 784 344 B1 | 5/2007 |
| EP | 1 839 543 | 10/2007 |
| EP | 1 975 087 A2 | 10/2008 |
| GB | 0 899 055 | 6/1962 |
| JP | S62-014821 | 1/1987 |
| WO | WO-03/002423 A1 | 1/2003 |
| WO | WO-2006/021405 A2 | 3/2006 |
| WO | WO-2008/018793 A2 | 2/2008 |
| WO | WO-2009/110783 | 9/2009 |
| WO | WO-2009/110783 A2 | 9/2009 |

OTHER PUBLICATIONS

State Intellectual Property Office of P.R.C. Search Report for Chinese Application No. 200980160941.9, dated May 26, 2013, 2 pages.

International Search Report and Written Opinion for PCT/NL2009/050834, dated Feb. 10, 2010, 2 pages.

Second Office Action for Chinese Patent Application No. 200980160941 with English Translation, dated Feb. 19, 2014, 8 pages.

Partial English Translation of Japanese Laid-Open Patent Application No. Sho-62-14821/1987 including Claims, Description, and Drawings.

* cited by examiner

SYSTEM, METHOD AND CAPSULE FOR PREPARING A BEVERAGE

CROSS-REFERENCE TO RELATED APPLICATIONS

The present application is a continuation of International Patent Application Serial No. PCT/NL2009/050834 filed on Dec. 30, 2009 (which is hereby incorporated herein by reference); which claimed priority to European Application Nos. EP09162927.9 filed on Jun. 17, 2009, EP09162941.0 filed on Jun. 17, 2009, EP09162917.0 filed on Jun. 17, 2009, and EP09162984.0 filed on Jun. 17, 2009 (all of which are hereby incorporated herein by reference).

BACKGROUND

The invention relates to a system for preparing a predetermined quantity of beverage suitable for consumption using an extractable product, comprising an exchangeable capsule, and an apparatus comprising a receptacle for holding the exchangeable capsule, and a fluid dispensing device for supplying an amount of a fluid, such as water, under pressure to the exchangeable capsule, wherein the exchangeable capsule comprises a circumferential wall, a bottom closing the circumferential wall at a first end, and a lid closing the circumferential wall at a second end opposite the bottom, wherein the wall, bottom and lid enclose an inner space comprising the extractable product, wherein the bottom comprises an entrance area for supplying an amount of a fluid by the fluid dispensing device through the entrance area to the capsule, wherein the lid comprises an exit area for supplying a prepared beverage through the exit area from the capsule to a container.

Such systems are known per se. In the system, such a capsule may be used with an entrance area through which the fluid is supplied to the capsule and an exit area through which the prepared beverage is dispensed from the capsule. For maintaining the extractable product in the open capsule, at least the exit area is usually provided with an exit layer. Also, the entrance area may be provided with an entrance layer.

A drawback of a system with such a capsule is that with the limited amount of extractable product in the capsule and the high pressure of the fluid, the quality of the prepared beverage may not be as desired.

SUMMARY

It is an object of the invention to improve the above system, and more specifically to improve the quality of the prepared beverage.

Thereto, according to the invention, a system is provided for preparing a predetermined quantity of beverage suitable for consumption using an extractable product, comprising an exchangeable capsule and an apparatus comprising a receptacle for holding the exchangeable capsule and a fluid dispensing device for supplying an amount of a fluid, such as water, under pressure to the exchangeable capsule, wherein the exchangeable capsule comprises a circumferential wall, a bottom closing the circumferential wall at a first end, and a lid closing the circumferential wall at a second end opposite the bottom, wherein the wall, bottom and lid enclose an inner space comprising the extractable product, wherein the bottom comprises an entrance area for supplying an amount of a fluid by the fluid dispensing device through the entrance area to the capsule, wherein the lid comprises an exit area for supplying a prepared beverage through the exit area from the capsule to a container, wherein a flow resistance of the entrance area of the capsule is lower than the flow resistance of the exit area, when the capsule comprises the extractable product.

By providing the exit area with a higher flow resistance than the entrance area, when the capsule comprises the extractable product, a pressure development may be achieved over the extractable product in the capsule, thus contributing to a better brewing of the beverage. Due to the pressure development within the extractable product in the capsule, a better extraction of the extractable product and thus a better beverage may be obtained. In particular, the beverage may contain more $CO_2$, which may result in a foam layer on the prepared beverage. Also, due to the pressure development within the extractable product, the fluid may stay longer in the capsule, so e.g. more taste may be extracted from the extractable product, thus resulting in e.g. a tastier prepared beverage. The fluid may be supplied to the capsule with a pressure of approximately twelve bars. Due to the flow resistance of, in particular the exit layer, a pressure build-up within the extractable product may be achieved. The flow resistance of, in particular the exit area, may be such as to prevent fluid going through until the pressure upstream of the exit area is lower than e.g. 4 to 5 bars.

By providing the exit area with a higher flow resistance than the entrance area, when the capsule is filled with the extractable product, the pressure build-up in the capsule may be more reproducible, which may result in a more constant coffee quality from one capsule to another.

The flow resistance is understood to be the resistance the exit (or entrance) layer in conjunction with the extractable product provides to the fluid flow. The exit layer together with the extractable product provides a barrier or flow restriction for the fluid flow in the capsule to discharge from the capsule. The barrier thus created is an indication for the flow resistance of the exit layer with the extractable product. The flow resistance is created by the exit layer in cooperation with the extractable product at the exit layer. Similarly, a flow resistance of an entrance layer in cooperation with the extractable product may be obtained.

The flow restriction may be formed by the filter layer itself and/or by the filter layer in combination with the grains of the extractable product, e.g. when grains partly obstruct pores and/or perforations of the filter. Depending on the grain size, the openings can be between approximately 0.2 mm and approximately 0.4 mm.

Advantageously a uniform pressure build-up within the extractable product in the capsule may be achieved, thus providing a better prepared beverage. Also, the time the hot water is in the capsule for extracting beverage from the extractable product may be optimized and/or controlled. A longer time the beverage can be extracted may result in a better quality beverage. The flow resistance of the exit layer determines the pressure that may be built up in the capsule before the flow resistance may overcome and the water fluid in the capsule flows through the exit layer.

An approximately uniform pressure development in the capsule from the bottom to the lid, may be an approximately uniform pressure drop. However, the pressure development may also be stepwise, e.g. a stepwise pressure drop over the capsule. For example, with a fluid pressure of approximately 12 bar, the pressure drop over the first part or upstream part of the capsule may be relatively small, e.g. 0.5 bar. Over the second part or downstream part of the capsule, the pressure drop may be relatively large, e.g. 6 bar. Over the exit area of the capsule, the pressure drop may be for example approximately 5 bars. The pressure drop over the exit area of the capsule may be between the exit layer in the exit area and the receptacle support surface or may be between the exit layer in the exit area and the lid piercing means of the receptacle. The pressure drop at the exit area may contribute to the forming of a foamed layer on the brewed beverage, for example, when the beverage is a cappuccino.

By providing a flow resistance that is higher at the exit area, when the capsule comprises the extractable product, than at the entrance area, when the capsule comprises the extractable product, of the capsule, an optimal pressure development in the capsule may be provided, and thus an optimal extraction of the extractable product may be obtained. So, an optimal brewed beverage may be obtained.

In an embodiment of the invention, the entrance layer and/or the exit layer of the capsule comprises a sheet-shaped perforate and/or porous layer. The perforations and/or the porosity of the layer may be adapted to provide an optimal flow resistance. For example, the porosity of the entrance layer may be larger than the porosity of the exit layer to obtain a lower flow resistance of the entrance layer than of the exit layer. Also, perforations of the entrance layer may be larger than perforations of the exit layer or there may be more perforations in the entrance layer than in the exit layer as to provide a lower flow resistance of the entrance layer than of the exit layer. Combinations may also be possible, so may the entrance layer be provided as a perforated sheet, but may the exit layer be provided as a porous sheet or vice versa. Also, the entrance layer and/or the exit layer itself may be a layer of a perforated sheet and a porous sheet. Also, a perforated sheet may be porous as well and vice versa.

In an embodiment the entrance layer and/or the exit layer of the capsule comprise a filtering paper and/or a polymeric film with a plurality of openings, wherein the exit layer comprises for example fewer openings than the entrance layer. During extraction, the paper layer and/or the film layer remain intact. The cross-section of the openings in the layer remains approximately unchanged during extraction of the beverage. The openings will not extend, or tear or rupture during use of the capsule in the apparatus of the system. By providing in particular the exit layer with a filtering paper and/or a polymeric film, the exit layer may be sufficiently strong to allow a pressure development within the extractable product in the capsule until a desired pressure has been reached.

In an embodiment, the entrance layer and/or the exit layer may be provided with a plurality of openings. The openings may be formed such that the flow resistance of the entrance layer is lower than the flow resistance of the exit layer. For example, the entrance layer may be provided with more openings than the exit layer. For example, the entrance layer may be provided with larger openings than the exit layer. For example, the entrance layer may be provided with openings in a different pattern than the pattern of the openings of the exit layer. Also, the openings in the layer may have a tapered shape, e.g. a conical shape. In the entrance layer, the openings may be tapered less than in the exit layer, when e.g. tapered in the flow direction.

In an embodiment, the flow resistance in the capsule increases from bottom towards lid. By providing a variable flow resistance over the capsule, pressure may be developed in the capsule before the prepared beverage leaves the capsule via the exit layer. Preferably, the flow resistance of the exit layer may be higher than the flow resistance in the capsule to enable the pressure to be built up in the capsule such that the pressure at the lid may be lower than the pressure at the bottom, and thus to provide for a better brewed beverage with a longer water/extractable product contact time and an optimal and/or controlled pressure. By varying the flow resistance and thus varying the water contact time and the pressure, the capsule may be adapted for providing an optimal beverage.

In an embodiment, the flow resistance in the capsule may be dependent on the compaction of the extractable product in the capsule. The compaction of the extractable product may be such that the flow resistance in the capsule increases towards the lid, such that a pressure drop over the capsule may be obtained. For example comprises the extractable product roasted and ground coffee. The compaction may then be varied depending on e.g. the grain size and/or the character of the coffee, i.e. whether the coffee is strong or mild or whether it is e.g. a cappuccino or an espresso. For example, for coffee with a larger grain size the degree of compaction may be less than for coffee with a smaller grain size. For example, for a mild coffee, the degree of compaction may be different than for a stark coffee. For example, the grain size of the coffee may be approximately between 0.2 and 0.4 mm for example 5 grams of ground coffee in a capsule. A capsule may e.g. be filled with between approximately 4-8 grams of roasted and ground coffee for preparing a single cup of beverage, e.g. from 30-200 ml of beverage, depending on e.g. the grain size, the degree of compaction, the character of the coffee (mild/strong). The exchangeable capsule may be a single portion pack.

In an embodiment, the extractable product may be compacted into a tablet of which the compaction is such that the flow resistance of the tablet increases towards the lid. When a tablet of compacted extractable product is used, the entrance layer may be omitted. The bottom has thus an entrance area through which an amount of fluid may be supplied without an entrance layer. The exit layer may be a filter layer to prevent extractable product from leaving the capsule. The flow resistance of the exit layer of the lid may then be higher than the flow resistance of the entrance area of the bottom. Also, the extractable product may comprise different tablets of compacted extractable products, e.g. of different compaction. The capsule near the lid may have the highest flow resistance, e.g. may have the highest degree of compaction. In an advantageous embodiment, the capsule may have no entrance layer and a consumer may fill its own capsule with tablets of roasted and ground coffee. Preferably, the exchangeable capsule is disposed after use, but a re-usable capsule may also be possible. A re-usable capsule may be filled by the consumer with one or more tablets of roasted and ground coffee. Preferably, in the re-usable capsule the entrance layer is omitted and the exit layer is sufficiently strong that cleaning may be possible. For example may the re-usable capsule be dishwasher-proof.

In an embodiment, the capsule may be provided with an additional sheet-shaped porous and/or perforate layer, wherein the layer is provided approximately parallel with the bottom and/or the lid. By providing one or more additional layers in the capsule, the flow resistance in the capsule may be varied such that the flow resistance in the capsule increases from the bottom towards the lid and the pressure decreases from the bottom towards the lid. Preferably, the flow resistance of the additional layer in cooperation with the extractable product is higher than the flow resistance of the entrance layer in cooperation with the extractable product and lower than the flow resistance of the exit layer in cooperation with the extractable product. Such an additional layer may be provided e.g. in addition to or in combination with a compacted extractable product. For example, by providing additional layers, the capsule may be divided into compartments. The thus obtained compartments may e.g. be filled with compacted extractable product of which the compaction is different for each compartment. By providing additional layers and/or variable compaction of the extractable product, an optimal flow resistance in the capsule may be created which may be optimally adapted for the beverage to be produced.

In an embodiment, the circumferential wall of the capsule may be provided with a rib to increase the flow resistance from the bottom towards the lid. The rib may provide a mechanical obstruction for the water in the capsule and may thus increase the flow resistance, thereby allowing the pressure to be built up in the capsule until a value optimal for brewing the beverage from the extractable product. For example, with an entrance pressure of approximately twelve bars, the pressure in the capsule may develop until approximately 4 to 5 bars, depending on the extractable product and/or the desired beverage. A further pressure drop, until e.g. 0.5 bar may occur over the exit area or between the exit area and the support surface and/or lid piercing means of the receptacle. A different type of extractable product may require e.g. a higher or a lower optimal pressure for preparing a good quality beverage. The rib may be wedge-shaped with an increasing cross-section towards the lid. Mechanical obstruction may also be provided by rod-shaped members extending between the bottom and the lid, e.g. wherein the rod-shaped members have an increasing cross-section towards the lid. Also, the circumferential wall may be provided with fins extending in a direction approximately transverse to the circumferential wall. Preferably, the fins extend towards the centre of the capsule to provide mechanical obstruction, and thus increasing flow resistance in the capsule.

Various combinations are possible to increase the flow resistance in the capsule from the bottom towards the lid. For example, an additional perforate and/or porous layer may be provided in combination with or in addition to mechanical obstruction and/or with compacted extractable product and/or with an exit layer with a certain flow resistance in combination with the extractable product at the exit layer, which is preferably higher than the flow resistance in the capsule, and/or with an entrance layer with a certain flow resistance in combination with the extractable product at the entrance layer, which is preferably lower than the flow resistance in the capsule.

In an embodiment, the circumferential wall of the capsule is substantially rigid. The capsule may thus not be prone to be deformed prior to use, so that the capsule may fit into the receptacle relatively easy. Preferably, the capsule comprises stiffening ribs integral with the circumferential wall and/or bottom to increase the rigidity of the capsule. In an advantageous embodiment, the stiffening ribs may also provide a mechanical obstruction to the fluid in the capsule thereby increasing the flow resistance.

The invention also relates to a capsule for preparing a predetermined quantity of beverage.

The invention further relates to a method for preparing a predetermined quantity of beverage.

The invention further relates to the use of a capsule for preparing a beverage using an apparatus of the system.

BRIEF DESCRIPTION OF THE DRAWINGS

The invention will now be further elucidated by means of, non-limiting, examples referring to the drawing, in which.

In the Figures corresponding parts are noted with corresponding numbers. The Figures are given as non-limiting examples of the invention.

DESCRIPTION OF EXEMPLARY EMBODIMENTS

Figure 1A:
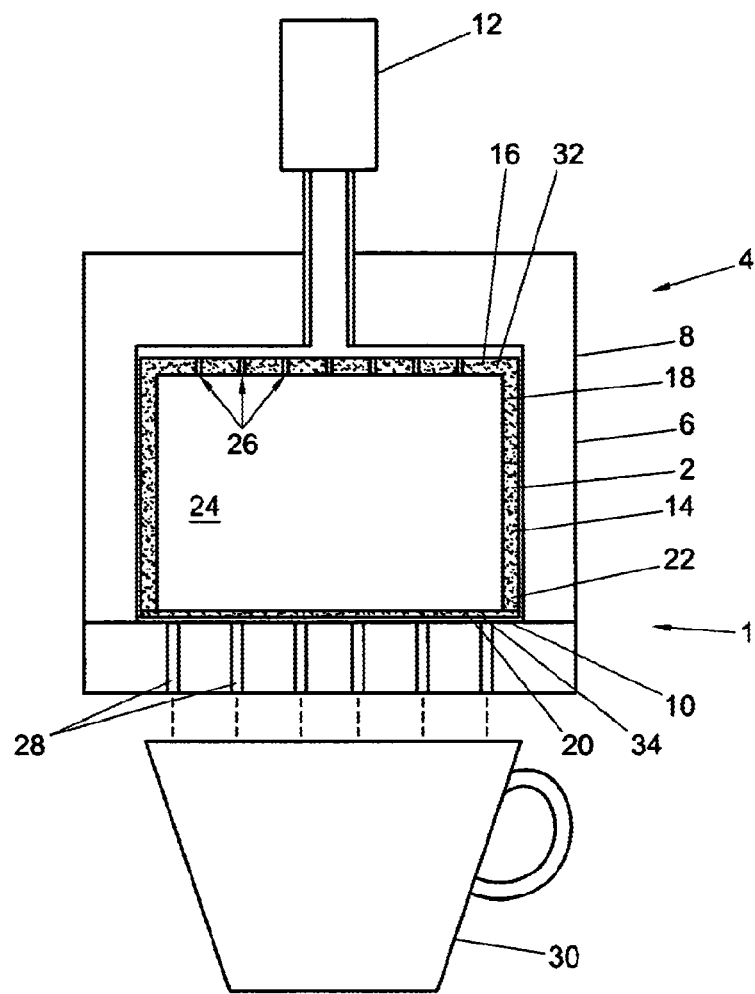
FIG. 1a shows an example of a first embodiment of a system according to the invention.

FIG. 1a shows an example of a first embodiment of a system 1 for preparing a predetermined quantity of beverage suitable for consumption using an extractable product according to the invention. The system 1 comprises an exchangeable open capsule 2, and an apparatus 4. The apparatus 4 comprises a receptacle 6 for holding the exchangeable capsule 2. In FIG. 1a a gap is drawn between the capsule 2 and the receptacle 6 for clarity. It will be appreciated that, in use, the capsule 2 may lie in contact with the receptacle 6. In this example the receptacle 6 has a shape complementary to the shape of the capsule 2. In this example the receptacle 6 comprises an upper part 8 and a support surface 10.

The apparatus 4 further comprises a fluid dispensing device 12 for supplying an amount of a fluid, such as hot water, under a high pressure, of e.g. more than approximately six bars (absolute pressure), e.g. 12 bars, to the exchangeable capsule 2.

In the system 1 shown in FIG. 1a, the exchangeable capsule 2 comprises a substantially rigid circumferential wall 14, a bottom 16 closing the circumferential wall 14 at a first end 18, and a lid 20 closing the circumferential wall 14 at a second, end 22 opposite the bottom 16. The circumferential first wall 14, the bottom 16 and the lid 20 enclose an inner space 24 comprising the extractable product, in this example roasted and ground coffee. In this example, the exchangeable capsule 2 comprises an amount of extractable product, e.g. approximately 4-8 grams of roasted and ground coffee, suitable for preparing a single portion of the beverage, preferably a single cup of the beverage, e.g. from 30-200 ml of the prepared beverage. The exchangeable capsule, thus, is a single-portion-pack.

In the example of FIG. 1a, the circumferential first wall 14 is substantially rigid. The circumferential wall 14 may e.g. comprise a plastics material and may be formed by e.g. injection moulding, vacuum-forming, thermoforming or the like.

In this example the bottom 16 is integral with the circumferential wall 14. In this example the bottom 16 is sheet-shaped and comprises a plurality of entrance openings 26 for allowing the fluid to enter the capsule 2.

In this example the lid 20 is sheet-shaped. Further, in this example the lid 20 is porous. The lid 20 is in this example manufactured from filtering paper. In this example the filtering paper comprises polyethylene (PE) fibres. Also, other fibres and/or filaments e.g. biodegradable or metal filaments may be possible. In this example the lid 20 is connected to the circumferential wall 14 by heat sealing. In this example the lid 20 forms an outermost boundary of the capsule 2 in an axial direction thereof. It can be seen from FIG. 1*a* that the lid 20 abuts against the support surface 10 of the receptacle 6. Many other variants of a filter layer may be possible.

The system 1 shown in FIG. 1*a* is operated as follows for preparing a cup of coffee.

The capsule 2 is placed in the receptacle 6. The lid 20 is brought into abutment with the support surface 10. The fluid, here hot water under pressure, e.g. 12 bar, is supplied to the extractable product in the inner space 24 through the entrance openings 26. The water will wet the coffee grounds and extract the desired substances to form the coffee beverage. The prepared coffee will drain from the capsule 2 through the porous lid 20. The coffee beverage is further drained from the receptacle 6 via a plurality of outlets 28, and may be supplied to a container 30 such as a cup.

In the example of FIG. 1*a*, the bottom 16 comprises an entrance layer 32 with a plurality of entrance openings 26 which are distributed over substantially the entrance layer 32. In this example the entrance layer 25 forms the bottom 16. The entrance layer 32 has a certain flow resistance determined by e.g. the width, the cross-section and/or the distribution of the entrance openings 26 over the entrance layer 32 and/or the material of the entrance layer 32 in combination with the extractable product. The flow resistance of the entrance layer is a property of the entrance layer in combination and/or in cooperation with the extractable product. The extractable product near the entrance layer also determines the flow resistance of the entrance area.

In the example of FIG. 1*a* the lid 20, forming an exit area of the capsule 2, through which the beverage, here coffee, can drain from the capsule, comprises an exit layer 34. In this example the exit layer 34 forms the lid 20. In this example, the exit layer 34 is formed by a porous sheet, such as filter paper. In this example the entire lid 20 is formed as the porous sheet exit layer 34. In this example the lid 20 forms a substantially continuous fluid-permeable sheet spanning substantially the entire second end 22 of the capsule 2. The exit layer 34 has a certain flow resistance determined by e.g. the porosity and/or permeability of the filter paper. The flow resistance of the exit layer is a property determined by the qualities of the exit layer in cooperation with the extractable product near the exit layer. The extractable product at the exit layer in combination with the exit layer itself provides a barrier or flow restriction or a resistance to the fluid in the capsule to discharge from the capsule. Once this barrier has been overcome by the fluid in the capsule, the fluid flows through the exit layer and drains from the capsule. This barrier is an indication of the flow resistance of the exit area when the capsule is filled with extractable product.

The flow resistance of the exit layer 34 is higher than the flow resistance of the entrance layer 32, to enable a pressure build-up in the capsule 2 before the beverage drains from the capsule 2 via the exit layer 20. For example, the hot water supplied with a pressure of approximately twelve bars and may the pressure in the capsule develop until approximately 4 to 5 bars. The pressure in the capsule 2 may be optimal for the brewing process and may give a better beverage. Also, the time the hot water is in the capsule 2 to extract beverage from the extractable product may become larger for a better extraction and thus may result in a better beverage. Also, pressure development upstream of the capsule may be prevented, which may damage the system 1 and/or is unfavourable for the brewing process. Over the entrance area there may be a small pressure drop (e.g. 0.5 bar), in the first part (upstream part) of the capsule, there may be a further small pressure drop (e.g. 0.5 bar), which may be followed by a larger pressure drop in the second part of the capsule (downstream part) (e.g. 4 to 5 bar). Over the entrance area and/or after the entrance area there may be a further pressure drop (e.g. 4 to 5 bar). This way a relatively optimal pressure development may be obtained over the capsule for an optimal extraction and brewing process.

Figure 1B:
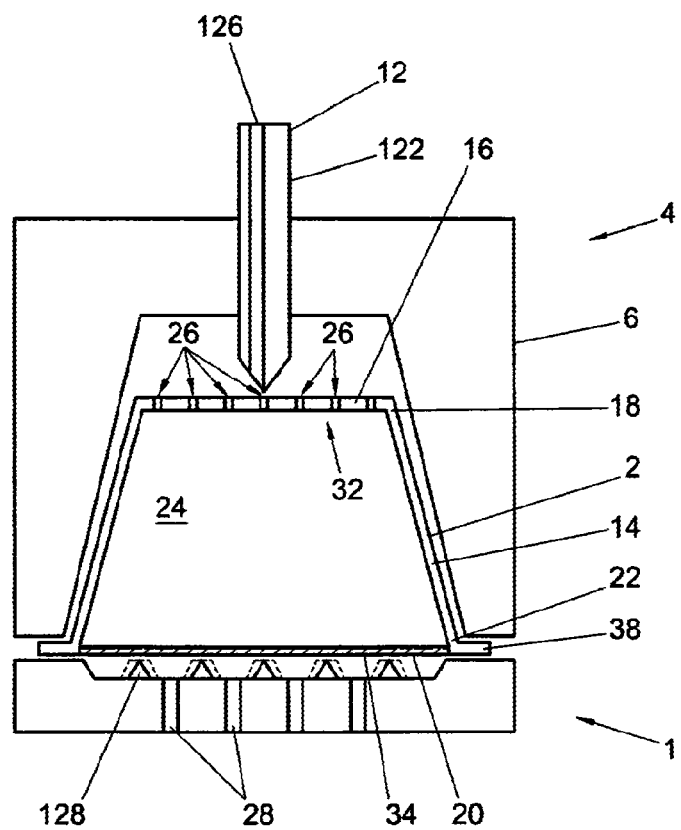
FIG. 1b shows an example of a second embodiment of a system according to the invention.

FIG. 1*b* shows an example of a second embodiment of a system 1 according to the invention for preparing a predetermined quantity of beverage suitable for consumption using an extractable product. The system 1 comprises an exchangeable capsule 2, and an apparatus 4. The apparatus 4 comprises a receptacle 6 for holding the exchangeable capsule 2. In this example, the receptacle 6 has a shape complementary to the shape of the capsule 2. In FIG. 1*b* a gap is drawn between the capsule 2 and the receptacle 6 for clarity. It will be appreciated that, in use, the capsule 2 may lie in contact with the receptacle 6. The apparatus 4 further comprises a fluid dispensing device 12 for supplying an amount of a fluid, such as water, under pressure to the exchangeable capsule 2.

In the system 1 shown in FIG. 1*b*, the exchangeable capsule 2 comprises a circumferential wall 14, a bottom 16 closing the circumferential wall 14 at a first end 18, and a lid 20 closing the circumferential wall 14 at a second end 22 opposite the bottom 16. The circumferential wall 14, the bottom 16 and the lid 20 enclose an inner space 24 comprising the extractable product. In this example, the exchangeable capsule 2 comprises an amount of extractable product suitable for preparing a single portion of the beverage, preferably a single cup of the beverage, e.g. from 30-200 ml of the prepared beverage. The exchangeable capsule, thus, is a single-portion-pack.

In this embodiment, the bottom 16 comprises an entrance layer 32 with entrance openings 26 distributed over the entrance layer 32, which are distributed over substantially the entire bottom 16. In the example of FIG. 1*b* the bottom 16 is integral with the circumferential wall 14.

In this embodiment, the system 1 of FIG. 1*b* comprises bottom piercing means 122 intended for piercing a capsule. FIG. 1*b* shows the bottom piercing means 122 in an extended position, intended for creating an entrance opening in the bottom 16 of a capsule. However, here the bottom 16 of the capsule 2 is positioned at a distance from the bottom piercing means 122, such that the capsule 2 is not pierced by the bottom piercing means 122 and the bottom 16 stays intact when the bottom piercing means 122 are brought in the extended position.

In FIG. 1*b* the bottom piercing means 122 comprise a bore 126 through which the fluid is supplied to an inner space of the receptacle 6. The fluid, here hot water under a pressure of e.g. more than 6 bars, e.g. 12 bars, will flow through the entrance layer 32 into the inner space 24 of the capsule 2 for extracting desired substances from the extractable product, in this example approximately 7 grams of roasted and ground coffee, for preparing, in this example the single cup of the beverage, here coffee. The flow resistance of the entrance layer 32 usually may be sufficiently low such that no pressure build-up upstream of the entrance layer in the receptacle 6 or the bore 126 may be possible, which may have a negative influence on the system 1 and/or the beverage.

In the example of FIG. 1*b*, the circumferential wall 14 is substantially rigid. The circumferential wall 14 may e.g.

comprise a plastics material and may be formed by e.g. injection moulding, vacuum-forming, thermoforming or the like, or may be from metal.

Further, the system 1 shown in FIG. 1b may comprise lid piercing means 128 intended for piercing the lid of an alternative capsule. However, the lid 20 of the capsule 2 comprises an exit layer 34, through which the beverage can be drained from the capsule 2. The exit layer 34 is arranged to having a sufficiently high tear strength and/or to be sufficiently stiff not to be pierced by the lid piercing means 128 under the influence of the pressure inside the capsule 2. However, the exit layer 34 may be deformed against the piercing means under influence of the pressure in the capsule, but will not rupture and/or tear and/or be pierced by the piercing means. A pressure drop over the capsule may result in a relatively optimal extraction and/or brewing process. A pressure drop between the exit layer 34 and the lid piercing means 128 may be present, which may be optimal for forming a foam layer on the brewed beverage.

In the example of FIG. 1b the exit filter 34, forming an exit area of the capsule 2, through which the beverage, here coffee, can drain from the capsule, is formed by a porous sheet, such as filter paper. In this example the exit filter 34 is positioned in the exit area of the lid 20. The exit filter 36 may form a substantially continuous fluid-permeable sheet spanning substantially the entire second end 22 of the capsule 2. Thus, the fluid can drain from the capsule 2 over a relatively large area.

The flow resistance of the exit layer 34 usually is high enough that a pressure build-up in the capsule 2 may occur in order to increase the time the hot water is in the capsule and/or to increase the pressure in the capsule. Preferably, the flow resistance of the exit layer 34 is higher than the flow resistance of the entrance layer 32, so an optimal pressure development may occur in the capsule 2 for a better extraction of the extractable product and for a better brewed beverage.

In addition to a sufficiently high flow resistance of the exit layer 34, the exit layer 34 may also have a sufficiently high tear strength and/or sufficiently stiffness such that the exit filter 34 does not deform and/or tear and/or rupture against the lid piercing means. When the exit filter 34 is e.g. made of filtering paper, parameters of the filtering paper, such as material, density, thickness and/or PE-content, can easily be chosen to provide the exit filter having sufficient high tear strength and/or forming sufficiently flow resistance. Alternatively, when the exit filter 34 is e.g. formed by a polymeric film provided with a plurality of exit openings, parameters of the polymeric foil, such as density, thickness, number of exit openings, size and/or shape of exit openings, can easily be chosen to provide the lid 20 having sufficient tear strength and/or forming sufficient flow resistance. Alternatively, the filter and/or the capsule may be formed from metal, or the material may have a metallic content.

Parameters of the exit layer 34 of the capsule 2 of the system 1 according to the invention may be chosen such that the exit layer 34 has sufficiently tear strength and/or sufficient flow resistance not to be pierced or torn.

Figure 2:
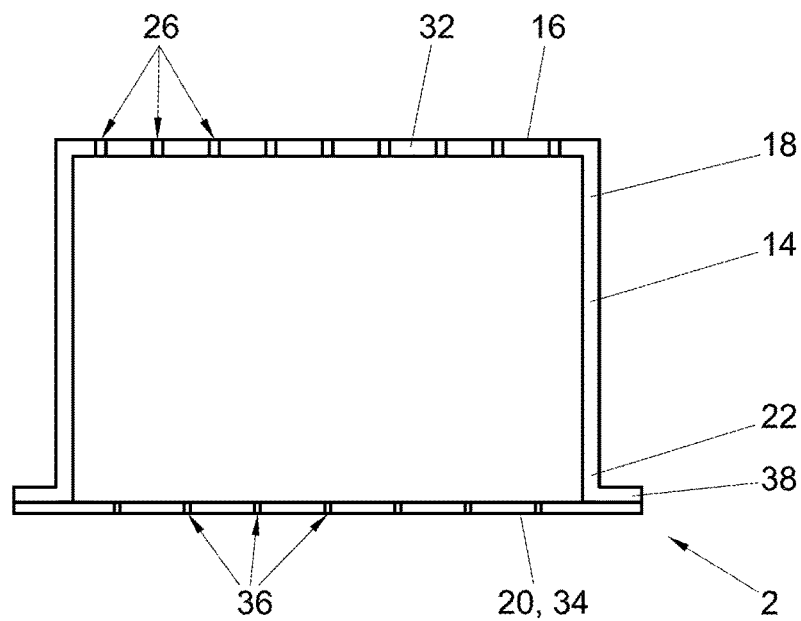
FIG. 2 shows an example of an embodiment of a capsule according to the invention.

In FIG. 2 is shown that the entrance layer 32 of the bottom 16 is integral with the circumferential wall 14. The entrance layer 32 comprises a plurality of entrance openings 26. The lid 20 comprises a foil exit layer 34, e.g. a polymeric foil, provided with a plurality of exit openings 36. The capsule 2 comprises an outwardly extending rim 38 to which the lid 20 is attached, e.g. by means of gluing, welding, heat sealing or the like. The exit layer 34 may comprise fewer openings than the entrance layer 32 such that the flow resistance of the exit layer 34 is higher than the flow resistance of the entrance layer 32. Also, the attachment of the exit layer 34 to the rim 38 may be sufficiently pressure resistant. Further, the entrance layer 32 may be e.g. a separate filter layer that may be attached to e.g. an inwardly extending rim 42 (e.g. shown in FIG. 3) of the bottom. Also, the entrance layer and/or the exit layer may be attached externally or internally to the circumferential wall 14. Also, the exit layer may be integrated with the circumferential wall.

Figure 3:
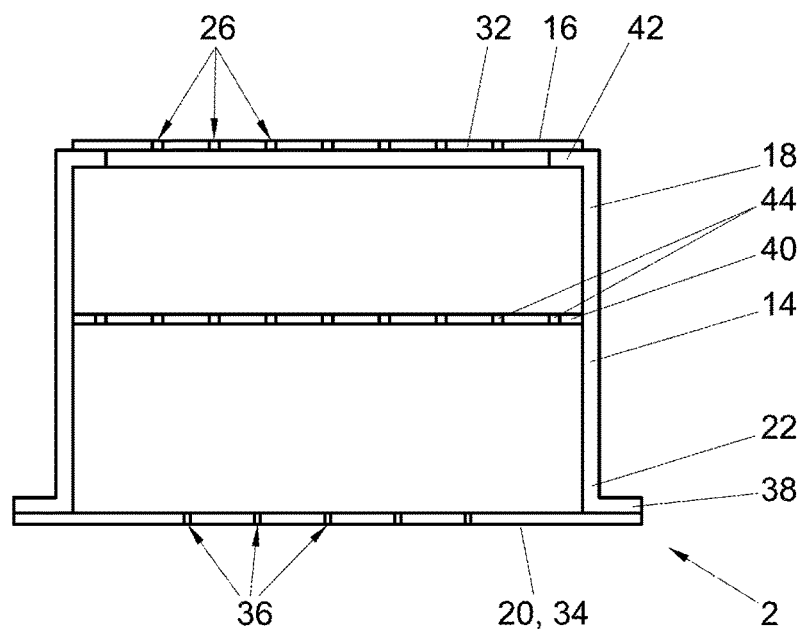
FIG. 3 shows an example of an embodiment of a capsule according to the invention.

In an embodiment, the flow resistance increases in the capsule from the bottom 16 towards the lid 20. For example, as shown in FIG. 3, an additional layer 40 may be provided in the capsule 2. The additional layer 40 may be a sheet-shaped porous and/or perforate layer that is provided approximately parallel with the entrance layer 32 and the exit layer 34. The additional layer of FIG. 3 is provided with openings 44. The flow resistance of the additional layer 40 is preferably higher than the flow resistance of the entrance layer 32 and lower than the flow resistance of the exit layer 34. The additional layer 40 therefore may have fewer openings 44 than the entrance layer 32 and have more openings 44 than the exit layer 34.

Figure 4:
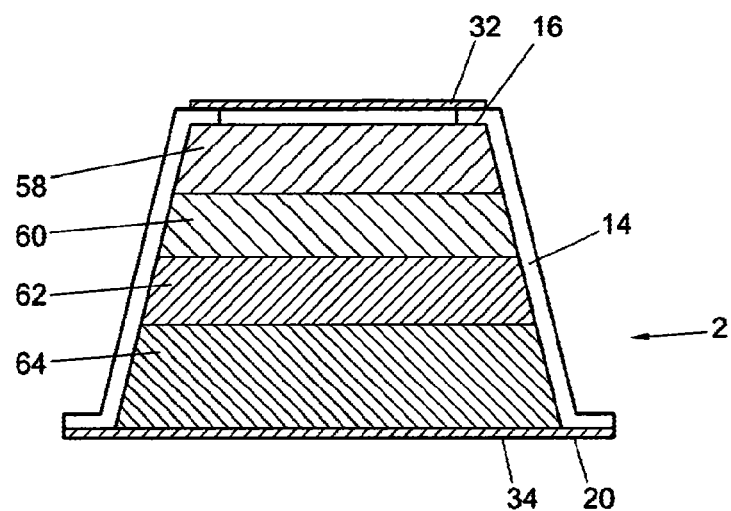
FIG. 4 shows an example of an embodiment of a capsule according to the invention.

Also, the flow resistance in the capsule 2 may be varied by providing the extractable product in compacted tablets 58, 60, 62 and 46, as shown in FIG. 4. The tablets each may have a different compaction grade and therefore the flow resistance of each tablet may be different. Preferably, the tablet near the bottom 16 has the lowest flow resistance and the tablet near the lid 20 has the highest flow resistance. Tablet 64 has a higher flow resistance than tablet 62, which has a higher flow resistance than tablet 60. Tablet 58 has a lower flow resistance. Also the flow resistance may vary over a tablet, with a higher flow resistance at one side and a lower flow resistance at an opposite side.

The flow resistance of the exit layer 34 is also higher than the flow resistance of the tablets, so an optimal pressure development, such as a pressure drop, may be obtained in the capsule for an optimal extraction. The pressure may thus be built up until a predetermined value, e.g. between approximately 4-10 bars, preferably 5 to 6 bars. Then the flow resistance of the exit layer 34 may be overcome and the extracted product may drain from the capsule via the exit layer 34 towards a cup 30, as shown in FIG. 1a. By providing sufficient pressure drop in the capsule 2 due to an increasing flow resistance from bottom 16 to lid 20, the quality of the extracted beverage may improve. Also, by providing an increasing flow resistance from bottom to lid, the time the hot water resides in the capsule 2 may increase, thus also improving the quality of the extracted beverage. Further, by providing a pressure drop over the exit area and/or after the exit area, for example between the exit layer and the lid piercing means, a foam forming effect may be obtained.

The flow resistance of the extractable product in the capsule 2 depends on e.g. the grain size of the product, the compaction grade of the product, the desired quality of the beverage, and many other variables. For example, the capsule 2 comprises roasted and ground coffee of which the compaction may be such as to increase the flow resistance from bottom to lid. Approximately a capsule may filled with 4-8 gram roasted and ground coffee. The grain size of the coffee may e.g. be between 0.2 and 0.4 mm for approximately 5 gram of ground coffee in the capsule 2.

Figure 5A:
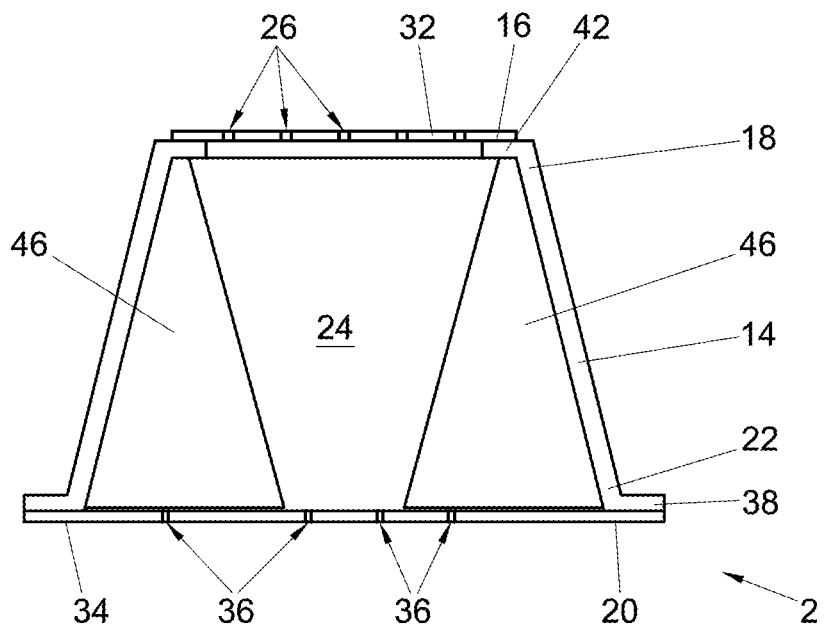
FIGS. 5a, 5b show an example of an embodiment of a capsule according to the invention.
Figure 5B:
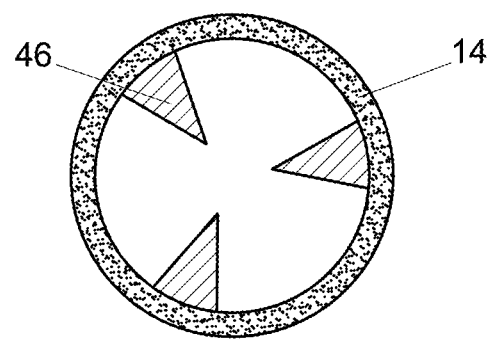

FIG. 5a and FIG. 5b show an embodiment of a capsule according to the invention in which the flow resistance increases from the bottom towards the lid by mechanical means. The mechanical means are in the embodiment of FIG. 5a and FIG. 5b wedge-shaped ribs 46. The cross-section of the ribs 46 increases from the bottom 16 towards the lid 20 in order to provide an obstruction for the water in the capsule 2 and thus increasing the flow resistance towards the lid. More than one rib 46 may be provided, also other means of mechanical obstruction may be provided, such as e.g. fins extending from the circumferential wall inwardly of the capsule.

In the foregoing specification, the invention has been described with reference to specific examples of embodiments of the invention. It will, however, be evident that various modifications and changes may be made therein without departing from the broader spirit and scope of the invention as set forth in the appended claims. The invention is not limited to the use of filtering paper for the exit and/or entrance layer. It may be clear that many other variants for the exit filter and/or the entrance filter are possible.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. An exchangeable capsule and apparatus for holding the exchangeable capsule for preparing a predetermined quantity of beverage suitable for consumption comprising:
    an exchangeable capsule, and
    an apparatus comprising a receptacle for holding the exchangeable capsule, and a fluid dispensing device constructed to supply an amount of a fluid under pressure to the exchangeable capsule,
    wherein the exchangeable capsule comprises a circumferential wall, a bottom closing the circumferential wall at a first end, and a lid closing the circumferential wall at a second end opposite the bottom, wherein the wall, bottom and lid enclose an inner space comprising an extractable product,
    wherein the bottom comprises an entrance area constructed to supply an amount of a fluid by the fluid dispensing device through the entrance area to the extractable product in the inner space of the exchangeable capsule,
    wherein the lid comprises an exit layer constructed to supply a prepared beverage through the exit layer from the exchangeable capsule to a container,
    wherein, prior to use, a flow resistance of the entrance area of the exchangeable capsule is lower than the flow resistance in the exchangeable capsule, and wherein, prior to use, the flow resistance in the exchangeable capsule is lower than the flow resistance of the exit layer in cooperation with the extractable product at the exit layer;
    wherein, prior to use, the flow resistance in the exchangeable capsule increases from the bottom towards the lid, and wherein, prior to use, a first portion of the extractable product is compacted to a first compaction density and a second portion of the extractable product located between the first portion and the lid is compacted to a second compaction density greater than the first compaction density such that the compaction density of the extractable product increases towards the lid.

2. The exchangeable capsule and apparatus according to claim 1, wherein the entrance area comprises an entrance layer.

3. The exchangeable capsule and apparatus according to claim 2, wherein the exit layer is substantially in the same plane as the bottom.

4. The exchangeable capsule and apparatus according to claim 2, wherein the entrance layer of the exchangeable capsule comprises a sheet-shaped perforate and/or porous layer.

5. The exchangeable capsule and apparatus according to claim 2, wherein the entrance layer comprises a perforate and/or porous filter.

6. The exchangeable capsule and apparatus according to claim 2, wherein the entrance layer of the exchangeable capsule comprises a filtering paper and/or a polymeric film with a plurality of openings, wherein the exit layer comprises fewer openings than the entrance layer.

7. The exchangeable capsule and apparatus according to claim 2, wherein the entrance layer of the exchangeable capsule comprises a plurality of openings, wherein the openings are formed such that the flow resistance of the entrance layer is lower than the flow resistance of the exit layer.

8. The exchangeable capsule and apparatus according to claim 1, wherein the exit layer of the exchangeable capsule comprises a sheet-shaped perforate and/or porous layer.

9. The exchangeable capsule and apparatus according to claim 1, wherein the exit layer comprises a perforate and/or porous filter.

10. The exchangeable capsule and apparatus according to claim 1, wherein the exit layer of the exchangeable capsule comprises a filtering paper and/or a polymeric film with a plurality of openings.

11. The exchangeable capsule and apparatus according to claim 1, wherein the exit layer of the exchangeable capsule comprises a plurality of openings, wherein the openings are formed such that prior to use the flow resistance of the entrance area is lower than the flow resistance of the exit layer.

12. The exchangeable capsule and apparatus according to claim 1, wherein the compaction of the extractable product in the exchangeable capsule is such prior to use that the flow resistance of the extractable product increases towards the lid.

13. The system according to claim 12, wherein the extractable product is compacted into a tablet of which the compaction is such that the flow resistance of the tablet increases towards the lid.

14. The system according to claim 13, wherein the capsule comprises a plurality of tablets, of which the tablet near the bottom has a lower flow resistance than the tablet near the lid.

15. The exchangeable capsule and apparatus according to claim 1, wherein, prior to use, the flow resistance increases continuously from the bottom towards the lid.

16. The exchangeable capsule and apparatus according to claim 1, wherein, prior to use, the flow resistance increases stepwise from the bottom towards the lid.

17. The exchangeable capsule and apparatus according to claim 1, wherein the extractable product comprises roasted and ground coffee.

18. The exchangeable capsule and apparatus according to claim 17, wherein the grain size of the roasted and ground coffee is approximately between 0.2 and 0.4 mm, for approximately 5 grams of ground coffee in the exchangeable capsule.

19. The exchangeable capsule and apparatus according to claim 1, wherein, prior to use, the flow resistance of the exit area of the exchangeable capsule is higher than the flow resistance of the extractable product in the capsule.

20. The exchangeable capsule and apparatus according to claim 1, wherein the circumferential wall is substantially rigid.

21. The exchangeable capsule and apparatus according to claim 1, further comprising:
an alternative capsule different from the exchangeable capsule, said alternative capsule having a lid,
said apparatus further comprising lid piercing means intended for piercing the lid of the alternative capsule, said lid of the alternative capsule being arranged for, during use, being pierced by said lid piercing means,
wherein the exit layer of the lid of the exchangeable capsule is arranged to have a sufficiently high tear strength and/or to be sufficiently stiff for, during use, not to be pierced by the lid piercing means of the apparatus under the influence of the pressure inside the exchangeable capsule.

22. The exchangeable capsule and apparatus according to claim 1, wherein the bottom and the lid are formed from a metal material.

23. A capsule for preparing a predetermined quantity of beverage suitable for consumption using an extractable product, the capsule comprising:
a circumferential wall, a bottom closing the circumferential wall at a first end, and a lid closing the circumferential wall at a second end opposite the bottom, wherein the wall, bottom and lid enclose an inner space comprising the extractable product,
wherein the bottom comprises an entrance area constructed to supply there through a fluid under pressure to the extractable product for preparing the beverage,
wherein the lid comprises an exit layer constructed to drain there through the prepared beverage from the capsule, and
wherein, prior to use, the flow resistance of the entrance area is lower than the flow resistance in the capsule, and wherein, prior to use, the flow resistance in the capsule is lower than the flow resistance of the exit layer in cooperation with the extractable product at the exit layer;
wherein, prior to use, the flow resistance in the capsule increases from the bottom towards the lid, and wherein, prior to use, a first portion of the extractable product is compacted to a first compaction density and a second portion of the extractable product located between the first portion and the lid is compacted to a second compaction density greater than the first compaction density such that the compaction density of the extractable product increases towards the lid.

24. The capsule according to claim 23, wherein the exit layer is arranged to have a sufficiently high tear strength and/or to be sufficiently stiff for, during use, not to be pierced by lid piercing means of an apparatus under influence of pressure inside the capsule.

25. A method for preparing a predetermined quantity of beverage suitable for consumption using an extractable product, the method comprising:
providing an exchangeable capsule, comprising a circumferential wall, a bottom closing the circumferential wall at a first end, and a lid closing the circumferential wall at a second end opposite the bottom, wherein the wall, bottom and lid enclose an inner space comprising the extractable product,
providing an apparatus comprising a receptacle for holding the exchangeable capsule, a fluid dispensing device constructed to supply an amount of a fluid under pressure to the exchangeable capsule, and an outlet which, in use, is in fluid communication with the exchangeable capsule for draining the prepared beverage from the exchangeable capsule and supplying the beverage to a container such as a cup, and
supplying the fluid to the extractable product for preparing the beverage,
wherein the bottom comprises an entrance area through which the fluid can be supplied to the exchangeable capsule,
wherein the lid comprises an exit layer constructed to drain there through the prepared beverage from the exchangeable capsule, and
wherein, prior to use, the flow resistance of the entrance area is lower than the flow resistance in the exchangeable capsule, and wherein, prior to use, the flow resistance in the exchangeable capsule is less than the flow resistance of the exit layer in cooperation with the extractable product at the exit layer;
wherein, prior to use, the flow resistance in the exchangeable capsule increases from the bottom towards the lid, and wherein, prior to use, a first portion of the extractable product is compacted to a first compaction density and a second portion of the extractable product located between the first portion and the lid is compacted to a second compaction density greater than the first compaction density such that the compaction density of the extractable product increases towards the lid.

26. A method according to claim 25, further comprising the steps of:
providing an alternative capsule different from the exchangeable capsule, said alternative capsule having a lid;
providing the apparatus with lid piercing means intended for piercing the lid of the alternative capsule, said lid of the alternative capsule being arranged for, during use, being pierced by said lid piercing means,
wherein the exit layer of the lid of the exchangeable capsule is arranged to have a sufficiently high tear strength and/or to be sufficiently stiff for, during use, not to be pierced by the lid piercing means of the apparatus under the influence of the pressure inside the capsule.

* * * * *